United States Patent
Rousseau

(10) Patent No.: US 10,265,913 B2
(45) Date of Patent: Apr. 23, 2019

(54) HORN FOR AN ULTRASONIC WELDING PROCESS

(71) Applicant: GM GLOBAL TECHNOLOGY OPERATIONS LLC, Detroit, MI (US)

(72) Inventor: Ingrid A. Rousseau, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 345 days.

(21) Appl. No.: 15/359,738

(22) Filed: Nov. 23, 2016

(65) Prior Publication Data

US 2018/0141279 A1    May 24, 2018

(51) Int. Cl.
  *B32B 37/00*    (2006.01)
  *B29C 65/08*    (2006.01)
  *B29C 65/00*    (2006.01)

(52) U.S. Cl.
  CPC ............ *B29C 65/082* (2013.01); *B29C 65/08* (2013.01); *B29C 66/1122* (2013.01); *B29C 66/41* (2013.01); *B29C 66/814* (2013.01); *B29C 66/81422* (2013.01); *B29C 66/81429* (2013.01); *B29C 66/8221* (2013.01); *B29C 66/863* (2013.01); *B29C 66/21* (2013.01); *B29C 66/721* (2013.01); *B29C 66/836* (2013.01); *B29C 66/8322* (2013.01); *B29C 66/8324* (2013.01)

(58) Field of Classification Search
  CPC ... B29C 65/08; B29C 65/082; B29C 66/1122; B29C 66/41; B29C 66/814; B29C 66/81422; B29C 66/81429; B29C 66/8221; B29C 66/863
  USPC ........................................................ 156/73.1
  See application file for complete search history.

(56) References Cited

U.S. PATENT DOCUMENTS

| | | | |
|---|---|---|---|
| 3,131,515 A | 5/1964 | Mason | |
| 3,764,427 A | 10/1973 | Reimels | |
| 4,087,297 A | 5/1978 | Johnson | |
| 4,713,131 A | 12/1987 | Obeda | |
| 4,865,680 A | 9/1989 | Pierson | |
| 5,269,297 A | 12/1993 | Weng | |
| 5,648,024 A | 7/1997 | Galas | |
| 5,759,318 A * | 6/1998 | Galas | B29C 33/0038 156/580.2 |
| 5,775,055 A | 7/1998 | Giacomelli | |
| 5,922,170 A | 7/1999 | Gerdes | |
| 7,377,416 B2 | 5/2008 | Yu | |
| 8,435,368 B2 * | 5/2013 | Romijn | B29C 65/08 156/73.1 |
| 8,651,163 B1 * | 2/2014 | Widhalm | B23K 20/106 156/580.2 |
| 2015/0129110 A1 | 5/2015 | Klinstein | |

FOREIGN PATENT DOCUMENTS

EP    475782 A1    3/1992

* cited by examiner

Primary Examiner — James D Sells

(57) ABSTRACT

A horn for an ultrasonic welding apparatus includes a body having an outer diameter surface and a convex welding tip having a first curved surface and a second curved surface. A peak curvature point is defined by the second curved surface. A base curvature point is defined at an intersection between the outer diameter surface and the first curved surface. An inner diameter is defined at an intersection between the first curved surface and the second curved surface.

11 Claims, 4 Drawing Sheets

HORN FOR AN ULTRASONIC WELDING PROCESS

FIELD

The present disclosure relates to ultrasonic welding systems.

INTRODUCTION

The statements in this section merely provide background information related to the present disclosure and may not constitute prior art.

During an ultrasonic welding process, adjacent workpieces are tightly clamped between an anvil and a welding horn or sonotrode. A controlled oscillation or vibration is applied in a particular range of frequencies and directions through the horn to the adjacent workpieces, thus creating substantial surface friction at or along interfacing surfaces of the workpieces. The resultant heat softens adjacent surfaces of the workpieces, thus bonding the workpieces upon cooling. The efficiency, consistency, reliability, and/or durability of the ultrasonic-welded part depends largely on the physical, thermodynamic, and thermomechanical properties of the workpiece and on the physical and electromechanical capabilities of the associated welding equipment.

SUMMARY

A horn for an ultrasonic welding apparatus includes a body having an outer diameter surface and a convex welding tip having a first curved surface and a second curved surface. A peak curvature point is defined by the second curved surface. A base curvature point is defined at an intersection between the outer diameter surface and the first curved surface. An inner diameter is defined at an intersection between the first curved surface and the second curved surface.

A method for joining workpieces includes providing the workpieces in a stacked arrangement and providing a robotic tool having an ultrasonic welding device at a distal end thereof. The ultrasonic welding device including a horn having a body with an outer diameter and a convex tip. The distal end of the robotic tool is moved to a first location adjacent a surface of the workpieces such that the horn of the ultrasonic welding device contacts the workpieces at the first location at a first angle from perpendicular. A vibration energy is generated by the ultrasonic welding device that propagates through the horn to the workpieces.

A horn for an ultrasonic welding apparatus includes a body having an outer diameter surface and a convex tip having a first radial surface and a second radial surface. The first radial surface and the second radial surface intersect at an inner diameter that is concentric with the outer diameter surface.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
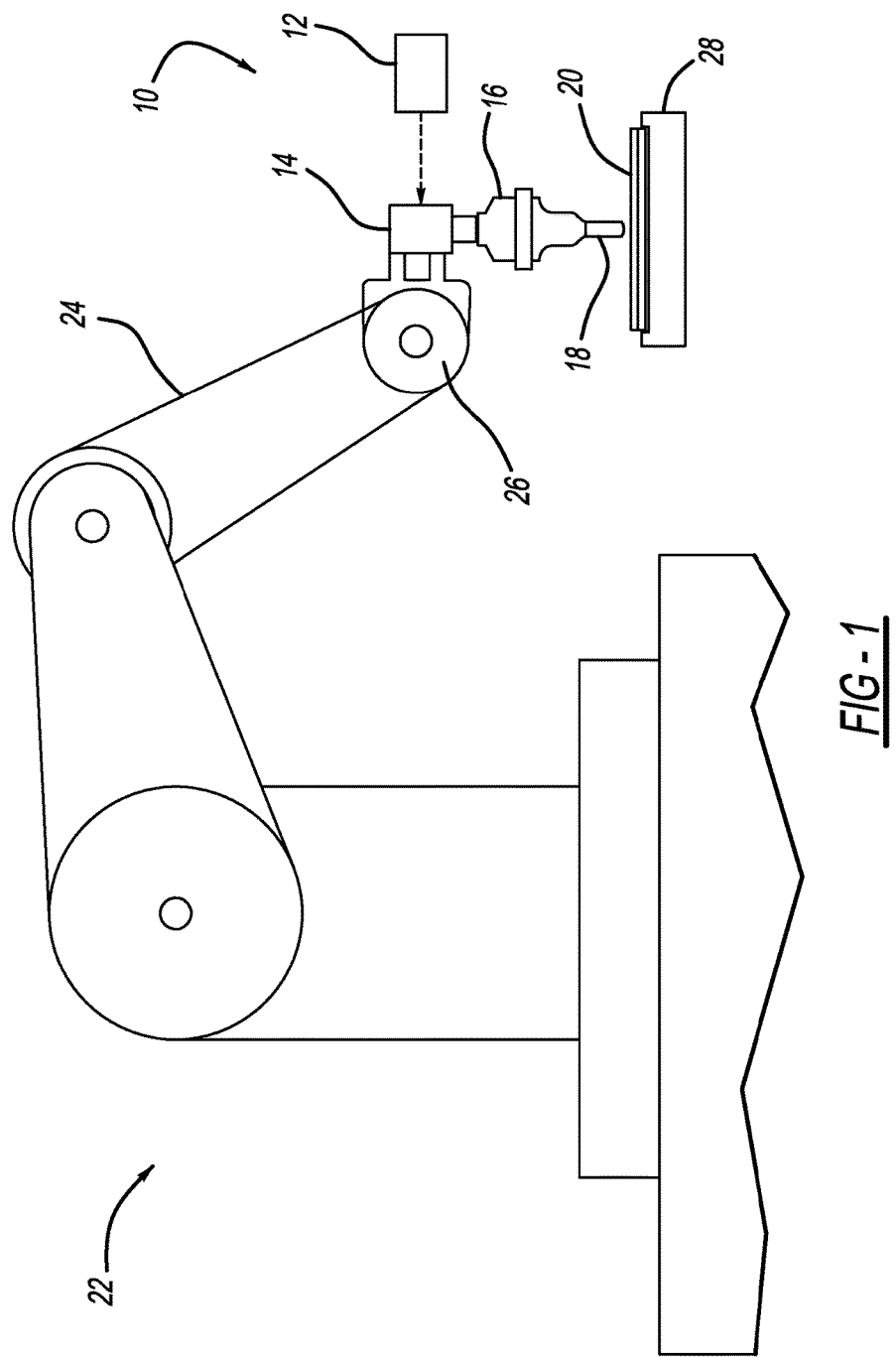
FIG. 1 is a schematic view of an exemplary ultrasonic welding system having a horn according to the present disclosure.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

Referring now to FIG. 1, an exemplary ultrasonic welding system 10 is adapted for forming a welded joint using an ultrasonic welding process. The ultrasonic welding system 10 is shown having a power supply 12 for converting line power into a form that is more readily useable for or conducive to ultrasonic welding. A power supply of the type typically used in an ultrasonic welding process, such as the power supply 12, can be electrically-connected to any suitable energy source (e.g., low-frequency electrical signal of about 50-60 Hz). The power supply 12 transforms the source power into a suitable power control signal having a predetermined waveform characteristic(s) suited for use in the ultrasonic welding process, for example a high frequency, high voltage electrical signal depending on the particular application (e.g., 15-70 kHz, and more particularly 20-40 kHz). The high frequency electrical signal is then converted to a mechanical vibration at an ultrasonic frequency in a converter 14 (e.g., transducer). The converter 14 has the required mechanical structure for producing the mechanical vibration or oscillation signal. An optional booster 16 may be included in the system 10 in order to magnify the amplitude of vibration.

The ultrasonic vibrations from the system then propagate through a horn or sonotrode 18. The horn 18 can focus the ultrasonic vibration and deliver the vibration energy to a specified area on a material. In other words, the horn 18 oscillates at a calibrated frequency and amplitude to thereby generate friction and heat at a welding interface between a mated pair of workpieces 20. The ultrasonic tooling system 10 also includes a tool positioning system 22 (e.g., a robotic arm 24 having an end effector 26) for moving the horn 18 in a direction adjacent to the workpieces 20 in order to apply a selected normal force to the workpieces 20 at a predetermined location during the ultrasonic process for applying a welding pressure thereto. The workpieces 20 may be arranged upon an anvil or nest 28 for support during the welding process. In some embodiments, however, the workpieces 20 may have enough inherent strength to support the process without the need for the anvil 28.

In a manufacturing environment, the tool positioning system 22 may be the robotic arm 24 having the end effector 26. When the tool positioning system 22 is the robotic arm 24, the end effector 26 may move the ultrasonic tool to the predetermined welding location(s) according to a welding schedule. The robotic arm 24 and the end effector 26 bring the ultrasonic tool (e.g., horn 18) to a position to contact the workpieces 20 to be welded. Because the robotic arm 24 and the end effector 26 include a plurality of articulated joints arranged in series, there are intrinsic compliance and positioning tolerances. These compliance and positioning tolerances can result in an off-normal approach at the ultrasonic tooling system 10 to the workpieces 20 on which it will act (e.g., less than 10 degrees from normal). Furthermore, an off-normal weld can result in reduced weld quality and strength, particularly when the horn has a flat welding tip.

Figure 2:
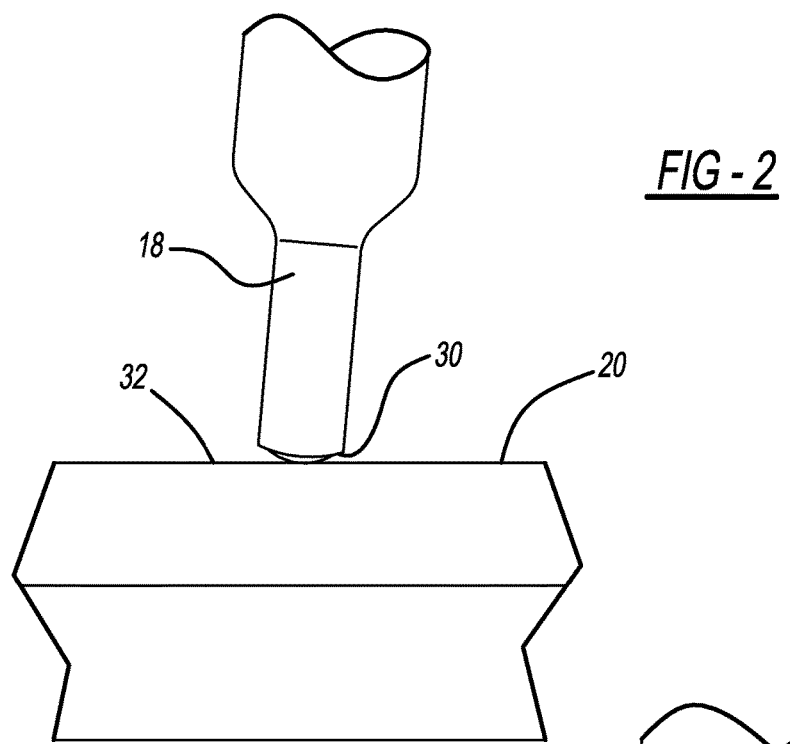
FIG. 2 is a schematic view of the exemplary horn according to the present disclosure.

With reference now to FIG. 2, the exemplary ultrasonic horn 18 is depicted having a convex welding tip 30 adapted for securing the workpieces 20 at a predetermined location 32. The convex welding tip 30 enables the horn 18 to produce a weld with consistent performance, in particular, a consistent weld diameter and weld strength. The dimensions of the cross-section of the convex welding tip 30 are dependent upon the amount of off-normal angle variation that can be expected in a specific manufacturing scenario. The convex welding tip 30 provides manufacturing flexibility that would otherwise not be available without an added vision or mechanical system for positional feedback and robot repositioning prior to welding. Furthermore, there is no need for modifications to the welding schedule to accommodate a loss in weld strength (e.g., increased number of welds).

Figure 3:
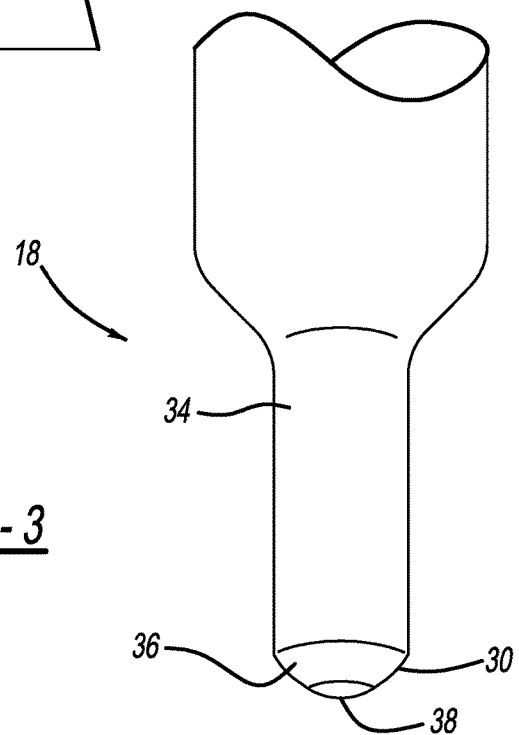
FIG. 3 is a perspective view of the horn of FIG. 2 depicting a convex tip portion according to the present disclosure.

Referring now to FIG. 3, the exemplary ultrasonic horn 18 may include the convex welding tip 30. The convex horn design enables x-y positional tolerances as well as angle of approach tolerance. The dimensions of each of the domes are dependent on the angular tolerance required for the application. Within typical manufacturing tolerances, a unique horn design may exist to cover the entire tolerance window. In one example, the horn 18 may include a standard outer diameter 34 straight design (e.g., 18 mm) terminating with the welding tip 30. The welding tip 30 may have a first radius of curvature 36 on the lower surface of the horn 18 extending from the outer diameter 34. The welding tip 30 may also have a second radius of curvature 38 on the lower surface of the horn 18 extending from the first radius of curvature 36. The convex welding tip 30 of the horn 18 may interact with the workpieces 20 at the predetermined location 32 through interaction with portions of the first and second radii of curvature 36, 38.

Figure 4A:
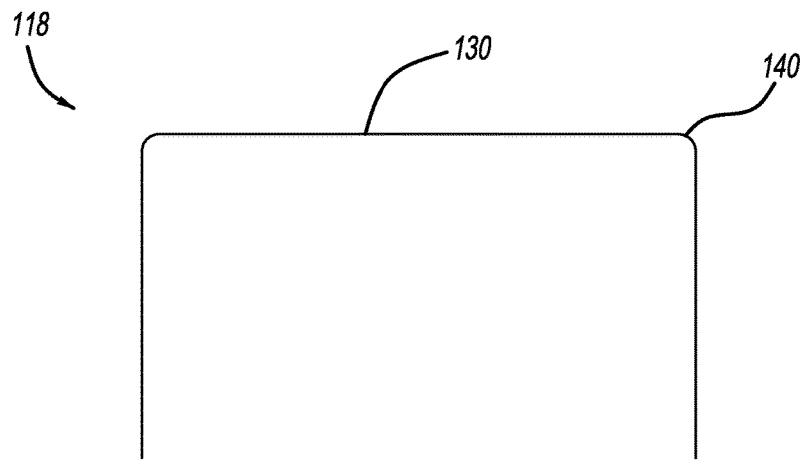
FIG. 4A is a perspective view of a prior art horn tip.

With reference to FIG. 4A, a prior art horn 118 having a flat tip 130 with an 18 mm diameter and a 1 mm full radius at corners 140 for composite and polymer joining is depicted and provides the following results:

| Weld Time (s) | Horn Angle (degrees from workpiece surface) | Max Load (lbf) | Std Dev Max Load (lbf) | Weld Diameter (mm) |
|---|---|---|---|---|
| 1.000 | 90 | 1890 | 166 | 20.4 ± 0.8 |
| 1.000 | 92 | 608 | 230 | 8.7 ± 1.1 |
| 1.000 | 90 | 1829 | 136 | 15.9 ± 1.2 |
| 1.000 | 92 | 680 | 193 | 9.2 ± 0.8 |
| 1.000 | 90 | 2190 | 197 | 19.1 ± 0.8 |
| 1.000 | 92 | 671 | 327 | 10.0 ± 2.2 |

Figure 4B:
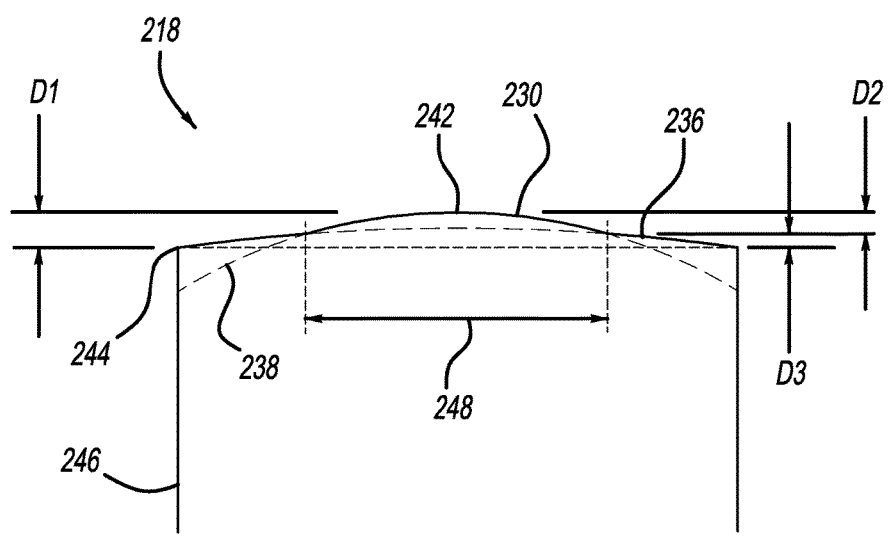
FIG. 4B is a perspective view of a first exemplary domed horn tip.

With reference to FIG. 4B, a first embodiment of an exemplary ultrasonic horn 218 including a convex welding tip 230 having a first radius of curvature 236 (e.g., 101.45 mm) and a second radius of curvature 238 (e.g., 46.99 mm) is depicted. The horn 218 may be used in a half wave, 30 kHz system. A peak curvature point 242 is associated with the second radius of curvature 238, while a base curvature point 244 is defined at the intersection between the outer diameter 246 (e.g., 18 mm) and the first radius of curvature 236. The intersection between the first radius of curvature 236 and the second radius of curvature 238 defines an inner diameter 248 (e.g., 13.5 mm) of the welding tip 230. The peak curvature point 242 to the base curvature point 244 defines a depth D1 (e.g., 0.650 mm); the peak curvature point 242 to the inner diameter 248 defines a depth D2 (e.g., 0.485 mm); and the inner diameter 248 to the base curvature point 244 defines a depth D3 (e.g., 0.165 mm). The exemplary horn 218 as described above provided the following results:

| Weld Time (s) | Horn Angle (degrees from workpiece surface) | Max Load (lbf) | Std Dev Max Load (lbf) | Weld Diameter (mm) |
|---|---|---|---|---|
| 1.412 | 90 | 1105 | 376 | 10.8 ± 1.3 |
| 2.282 | 92 | 895 | 294 | 11.3 ± 2.2 |
| 1.474 | 90 | 948 | 219 | 12.7 ± 2.3 |

Figure 4C:
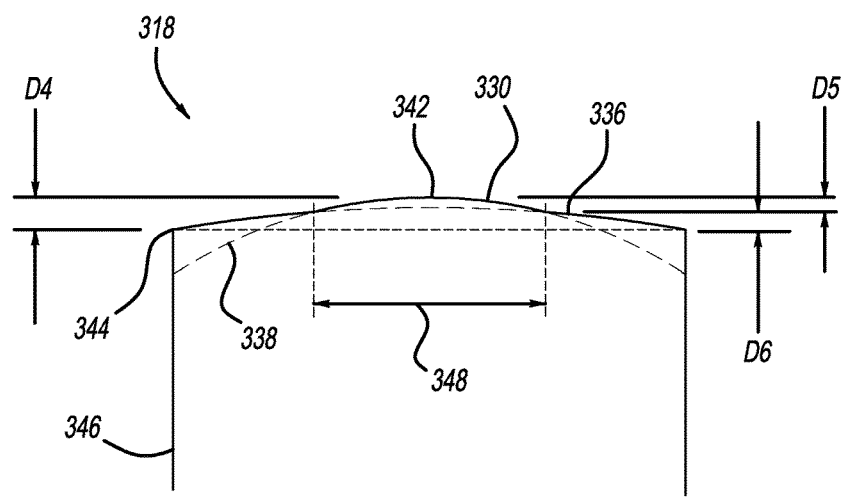
FIG. 4C is a perspective view of a second exemplary domed horn tip.

With reference to FIG. 4C, a second embodiment of an exemplary ultrasonic horn 318 including a convex welding tip 330 having a first radius of curvature 336 (e.g., 101.45 mm) and a second radius of curvature 338 (e.g., 46.99 mm) is depicted. The horn 318 may be used in a half wave, 30 kHz system. A peak curvature point 342 is associated with the second radius of curvature 338, while a base curvature point 344 is defined at the intersection between the outer diameter 346 (e.g., 18 mm) and the first radius of curvature 336. The intersection between the first radius of curvature 336 and the second radius of curvature 338 defines an inner diameter 348 (e.g., 8.9 mm) of the welding tip 330. The peak curvature point 342 to the base curvature point 344 defines a depth D4 (e.g., 0.518 mm); the peak curvature point 342 to the inner diameter 348 defines a depth D5 (e.g., 0.208 mm); and the inner diameter 348 to the base curvature point 344 defines a depth D6 (e.g., 0.310 mm). The exemplary horn 318 as described above provided the following results:

| Weld Time (s) | Horn Angle (degrees from normal) | Max Load (lbf) | Std Dev Max Load (lbf) | Weld Diameter (mm) |
|---|---|---|---|---|
| 1.398 | 90 | 935 | 313 | 11.1 ± 2.7 |
| 1.673 | 92 | 1221 | 519 | 11.3 ± 2.6 |
| 2.230 | 95 | 653 | 131 | 10.5 ± 1.8 |

Figure 4D:
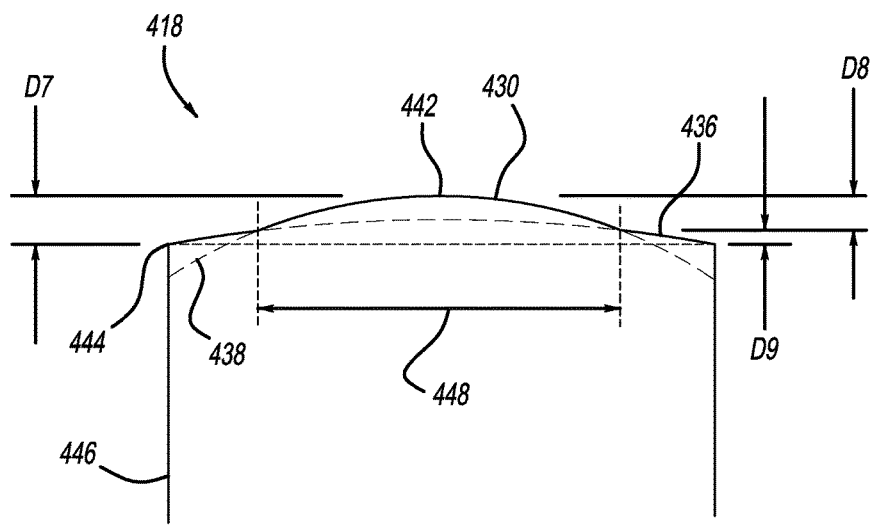
FIG. 4D is a perspective view of a third exemplary domed horn tip.

With reference to FIG. 4D, a third embodiment of an exemplary ultrasonic horn 418 including a convex welding tip 430 having a first radius of curvature 436 (e.g., 101.45 mm) and a second radius of curvature 438 (e.g., 46.99 mm) is depicted. The horn 418 may be used in a half wave, 20 kHz system. A peak curvature point 442 is associated with the second radius of curvature 438, while a base curvature point 444 is defined at the intersection between the outer diameter 446 (e.g., 18 mm) and the first radius of curvature 436. The intersection between the first radius of curvature 436 and the second radius of curvature 438 defines an inner diameter 448 (e.g., 13.5 mm) of the welding tip 430. The peak curvature point 442 to the base curvature point 444 defines a depth D7 (e.g., 0.662 mm); the peak curvature point 442 to the inner diameter 448 defines a depth D8 (e.g., 0.487 mm); and the inner diameter 448 to the base curvature point 444 defines a depth D9 (e.g., 0.175 mm).

Embodiments of the present disclosure are described herein. This description is merely exemplary in nature and, thus, variations that do not depart from the gist of the disclosure are intended to be within the scope of the disclosure. For example, the exemplary ultrasonic tooling system 10 shown in FIG. 1 represents only one example of a source of ultrasonic mechanical energy that may be used according to the embodiments disclosed herein. As such, it should be understood that any suitable ultrasonic apparatus may be employed to practice the disclosed embodiments. Furthermore, the exemplary horns provided herein are shown having a peak curvature point to a base curvature point that is less than 1 mm; however, it should be understood that the convex dome dimensions are dependent upon the angular tolerance required.

Furthermore, the figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations and are deemed to be within the scope of this disclosure.

What is claimed is:

1. A horn for a ultrasonic welding apparatus, the horn comprising:
   a body having an outer diameter surface; and
   a convex welding tip having a first curved surface and a second curved surface, wherein a peak curvature point is defined by the second curved surface, a base curvature point is defined at an intersection between the outer diameter surface and the first curved surface, and an inner diameter is defined at an intersection between the first curved surface and the second curved surface, and wherein a first depth is defined between the peak curvature point and the base curvature point, a second depth is defined between the peak curvature point and the inner diameter, and a third depth is defined between the base curvature point and the inner diameter, and wherein the second depth and the third depth, combined, equal the first depth.

2. The horn of claim 1, wherein the first depth is less than 1 mm.

3. The horn of claim 1, wherein the first curved surface defines a first dome-shaped welding surface and the second curved surface defines a second dome-shaped welding surface.

4. The horn of claim 1, wherein the inner diameter is concentric with the outer diameter surface.

5. A method for joining workpieces, comprising:
   providing the workpieces in a stacked arrangement;
   providing a robotic tool having an ultrasonic welding device at a distal end thereof, the ultrasonic welding device including a horn having a body with an outer diameter and a convex tip, wherein the convex tip has a first curved surface and a second curved surface, wherein a peak curvature point is defined by the second curved surface, a base curvature point is defined at an intersection between the outer diameter and the first curved surface, and an inner diameter is defined at an intersection between the first curved surface and the second curved surface, and wherein a first depth is defined between the peak curvature point and the base curvature point, a second depth is defined between the peak curvature point and the inner diameter, and a third depth is defined between the base curvature point and the inner diameter, and wherein the second depth and the third depth, combined, equal the first depth;
   moving the distal end of the robotic tool to a first location adjacent a surface of the workpieces such that the horn of the ultrasonic welding device contacts the workpieces at the first location at a first angle from perpendicular; and
   generating a vibration energy by the ultrasonic welding device that propagates through the horn to the workpieces.

6. The method of claim 5, wherein the inner diameter is concentric with the outer diameter.

7. The method of claim 5, further comprising:
   moving the distal end of the robotic tool to a second location adjacent the surface of the workpieces such that the horn of the ultrasonic welding device contacts the workpieces at the second location at a second angle from perpendicular.

8. The method of claim 7, wherein the first angle and the second angle are less than seven degrees from normal.

9. A horn for an ultrasonic welding apparatus, the horn comprising:
   a body having an outer diameter surface; and
   a convex tip having a first radial surface and a second radial surface, wherein the first radial surface and the second radial surface intersect at an inner diameter that is concentric with the outer diameter surface, wherein a peak curvature point is defined by the second radial surface and a base curvature point is defined at an intersection between the outer diameter surface and the first radial surface, and wherein a first depth is defined between the peak curvature point and the base curvature point, a second depth is defined between the peak curvature point and the inner diameter, and a third depth is defined between the base curvature point and the inner diameter, and wherein the second depth and the third depth, combined, equal the first depth.

10. The horn of claim 9, wherein the first depth is less than 1 mm.

11. The horn of claim 9, wherein the convex tip is configured to engage a workpiece at a workpiece surface with at least a portion of both the first radial surface and the second radial surface.

* * * * *